United States Patent
Wang et al.

(10) Patent No.: US 9,598,642 B2
(45) Date of Patent: Mar. 21, 2017

(54) DISTRIBUTIVE TEMPERATURE MONITORING USING MAGNETOSTRICTIVE PROBE TECHNOLOGY

(71) Applicants: Ke Wang, Sugar Land, TX (US); Thomas M. Scott, Cypress, TX (US); Zhiyue Xu, Cypress, TX (US)

(72) Inventors: Ke Wang, Sugar Land, TX (US); Thomas M. Scott, Cypress, TX (US); Zhiyue Xu, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 149 days.

(21) Appl. No.: 14/326,013

(22) Filed: Jul. 8, 2014

(65) Prior Publication Data

US 2015/0096942 A1  Apr. 9, 2015

Related U.S. Application Data

(63) Continuation-in-part of application No. 14/046,332, filed on Oct. 4, 2013, now Pat. No. 9,422,806.

(51) Int. Cl.
*G01K 7/36* (2006.01)
*G01K 13/02* (2006.01)
(Continued)

(52) U.S. Cl.
CPC ............ *C10G 1/008* (2013.01); *G01K 1/024* (2013.01); *G01K 1/026* (2013.01); *G01K 11/22* (2013.01);
(Continued)

(58) Field of Classification Search
CPC . G01K 11/22; G01K 3/14; G01K 7/00; G01K 3/00; G01K 11/00; G01K 13/02; G01K 7/36
(Continued)

(56) References Cited

U.S. PATENT DOCUMENTS 3,197,316 A * 7/1965 Beach ........................ 166/293
3,217,543 A * 11/1965 Van Haagen .......... G01K 13/10
136/232
(Continued)

FOREIGN PATENT DOCUMENTS

CN   101256091 A  *  9/2008
CN   100587413 C  *  2/2010
(Continued)

OTHER PUBLICATIONS

PCT International Search Report and Written Opinion: International Application No. PCT/US2014/053662; International Filing Date: Sep. 2, 2014; Date of Mailing: Dec. 12, 2014; pp. 1-10.
(Continued)

*Primary Examiner* — Gail Kaplan Verbitsky
(74) *Attorney, Agent, or Firm* — Cantor Colburn LLP

(57) ABSTRACT

A method of measuring and controlling a temperature distribution at a member is disclosed. A probe is placed proximate the member. The probe has a plurality of longitudinally-spaced reflective elements. An ultrasonic pulse is generated at a selected location of the probe so as to propagate along the probe. Reflected pulses are received at the selected location from the plurality of longitudinally-spaced reflective elements. The distribution of temperature at the member is determined from the reflected pulses. The determined distribution of temperature may be used in controlling the temperature of the member. The member may be a solid or fluid.

17 Claims, 2 Drawing Sheets

(51) Int. Cl.
*G01K 3/00* (2006.01)
*G01K 11/00* (2006.01)
*C10G 1/00* (2006.01)
*G01K 11/22* (2006.01)
*G01K 1/02* (2006.01)

(52) U.S. Cl.
CPC . *C10G 2300/4006* (2013.01); *G01K 2213/00* (2013.01)

(58) Field of Classification Search
USPC .......... 374/137, 29, 141, 117, 118, 119, 166, 374/136, 163; 248/542; 324/331
See application file for complete search history.

(56) References Cited

U.S. PATENT DOCUMENTS

| | | | | |
|---|---|---|---|---|
| 3,361,680 | A * | 1/1968 | Bohrer | B01F 3/0819 516/21 |
| 3,456,715 | A * | 7/1969 | Freedman et al. | 164/151.3 |
| 3,540,265 | A | 11/1970 | Lynnworth | |
| 3,636,754 | A * | 1/1972 | Lynnworth | G01L 11/04 73/597 |
| 3,822,820 | A * | 7/1974 | Brouwer | C23C 2/32 118/429 |
| 4,008,608 | A * | 2/1977 | Reynolds | 73/152.12 |
| 4,408,160 | A * | 10/1983 | King | G01B 7/24 324/209 |
| 4,483,630 | A * | 11/1984 | Varela | G01K 11/22 374/117 |
| 4,893,496 | A * | 1/1990 | Bau | E21B 47/101 73/152.55 |
| 5,022,014 | A * | 6/1991 | Kulczyk et al. | 367/87 |
| 5,274,328 | A | 12/1993 | Begin et al. | |
| 5,320,325 | A | 6/1994 | Young et al. | |
| 5,406,200 | A | 4/1995 | Begin et al. | |
| 5,581,037 | A * | 12/1996 | Kwun | G01N 29/14 324/220 |
| 5,941,307 | A | 8/1999 | Tubel | |
| 6,009,948 | A | 1/2000 | Flanders et al. | |
| 6,047,602 | A * | 4/2000 | Lynnworth | G01F 1/662 73/632 |
| 6,279,653 | B1 | 8/2001 | Wegener et al. | |
| 6,517,240 | B1 * | 2/2003 | Herb | G01K 11/24 374/117 |
| 6,644,848 | B1 | 11/2003 | Clayton et al. | |
| 7,377,333 | B1 | 5/2008 | Sugiura | |
| 7,779,912 | B2 | 8/2010 | Gissler | |
| 2005/0104584 | A1 * | 5/2005 | Kwun | G01N 27/82 324/238 |
| 2006/0079815 | A1 * | 4/2006 | Sato | G01F 1/663 601/2 |
| 2006/0146337 | A1 | 7/2006 | Hartog | |
| 2006/0245467 | A1 * | 11/2006 | Casella | G01D 4/002 374/41 |
| 2007/0229232 | A1 | 10/2007 | Hall et al. | |
| 2008/0163692 | A1 | 7/2008 | Huang et al. | |
| 2009/0314546 | A1 | 12/2009 | Mintchev et al. | |
| 2010/0270022 | A1 * | 10/2010 | Crews | 166/308.3 |
| 2011/0192597 | A1 | 8/2011 | Roddy et al. | |
| 2011/0226469 | A1 | 9/2011 | Lovell et al. | |
| 2011/0277844 | A1 * | 11/2011 | Musa et al. | 137/1 |
| 2011/0292384 | A1 | 12/2011 | Ramos et al. | |
| 2012/0147924 | A1 | 6/2012 | Hall | |
| 2014/0208821 | A1 * | 7/2014 | Jaaskelainen | 73/1.15 |
| 2014/0262265 | A1 * | 9/2014 | Hutchins et al. | 166/280.2 |
| 2015/0098487 | A1 * | 4/2015 | Wang | G01D 5/485 374/142 |
| 2015/0354351 | A1 * | 12/2015 | Morrow | E21B 47/01 367/82 |
| 2016/0161327 | A1 * | 6/2016 | Starkey | G01H 9/004 73/655 |

FOREIGN PATENT DOCUMENTS

| | | |
|---|---|---|
| CN | 201818297 U * | 5/2011 |
| CN | 102411031 B * | 12/2012 |
| EP | 870900 A1 | 10/1998 |
| EP | 1691173 A1 | 8/2006 |
| WO | 2011048373 A2 | 4/2011 |

OTHER PUBLICATIONS

PCT International Search Report and Written Opinion; International Application No. PCT/US2014/059305; International Filing Date: Oct. 6, 2014; Date of Mailing: Jan. 16, 2015; pp. 1-12.

PCT International Search Report and Written Opinion; International Application No: PCT/US2014/059302; International Filing Date: Oct. 6, 2014; Date of Mailing: Mar. 18, 2015; pp. 1-8.

Brimmer, A.R.; "Deepwater Chemical Injection Systems: The Balance Between Conservatism and Flexibility," PTC 18308, 2006 Offhore Technology Conference, Houston, Texas, U.S.A., May 1-4, 2006, pp. 1-14.

Daw, Joshua et al.; "Ultrasonic Thermometry for In-Pile Temperature Detection," Seventh Americal Nuclear Society International Topical Meeting on Nuclear Plant Instrumentation Control and Human-Machine Interface Technologies NPIC&HMIT 2010, Los Vegas, Nevada, Nov. 7-11, 2010, pp. 1-11.

MTS Sensors; "Magnetostrictive Linear-Position Sensors," Technical Paper, 551045 D, 2006, pp. 1-6.

Dr. Peter Collins; "Staying on Top From the Desktop," World Pipelines, vol. 13, No. 07, Jul. 2013, 3 pages.

* cited by examiner

DISTRIBUTIVE TEMPERATURE MONITORING USING MAGNETOSTRICTIVE PROBE TECHNOLOGY

CROSS REFERENCE TO RELATED APPLICATIONS

This application is a continuation-in-part of U.S. patent application Ser. No. 14/046,332, filed Oct. 4, 2013.

BACKGROUND OF THE DISCLOSURE

1. Field of the Disclosure

The present invention is related to monitoring temperature distributions in the petroleum industry and, in particular, to the use of magnetostrictive probe technology for obtaining distributed temperature measurements of materials in pipelines or other flow members.

2. Description of the Related Art

In petroleum engineering, fluids such as hydrocarbons, petroleum, oil etc. are extracted from a reservoir in the earth. Once at the surface, the fluid is generally transported to a selected location through a flow member such as an above-ground pipeline, a seabed pipeline, a riser, a flowline, or a pipe or conduit at a refinery, liquid natural gas factory or other manufacturing facility. Fluid temperature is an important parameter controlling fluid flow through the flow member. For example, wax formation, hydrate formation or other changes in chemical composition can occur within the fluid at certain temperatures, thereby affecting the flow rate, flow profile, etc. Current methods of obtaining temperature measurements at a flow member tend to measure temperature at only one location. However, a temperature measurement at a single location of the flow member is generally inadequate when attempting to monitor and/or control flow of fluids in the flow member. Attempts to implement single temperature measurements at multiple locations along a flow member can be costly. Thus, there is a need to provide cost-effective methods for obtaining temperature measurements at multiple locations along pipelines or flow members.

SUMMARY OF THE DISCLOSURE

In one aspect the present disclosure provides a method of measuring a temperature distribution at a member, the method including: placing a probe proximate the member, the probe having a plurality of longitudinally-spaced reflective elements; generating an ultrasonic pulse at a selected location of the probe to propagate the ultrasonic pulse along the probe; receiving at the selected location reflected pulses from the plurality of longitudinally-spaced reflective elements; and estimating from the reflected pulses a distribution of temperature at the member.

In another aspect, a system for controlling a temperature of a member includes: a sensor in thermal communication with the member, the sensor including: a probe including a plurality of longitudinally spaced-apart reflective elements, and a magnetostrictive transducer configured to generate an ultrasonic pulse for propagating along the probe and to receive ultrasonic pulses reflected from the reflective elements of the probe; and a processor configured to: determine a distribution of temperature of the member from the received ultrasonic pulses, and alter a parameter of the member when the determined distribution of temperature meets a selected criterion with respect to a selected threshold temperature.

In yet another aspect, the present disclosure provides an apparatus for controlling a temperature of a fluid, including: a sensor in thermal communication with the fluid, the magnetostrictive probe including: a probe including a plurality of longitudinally spaced-apart reflective elements, and a magnetostrictive transducer configured to generate an ultrasonic pulse for propagating along the probe and to receive ultrasonic pulses reflected from the reflective elements of the probe; a chemical injection unit; and a processor configured to: determine a temperature distribution of the fluid from the received ultrasonic pulses, and operate the chemical injection unit to inject a chemical additive into the fluid when the determined temperature distribution meets a selected criterion with respect to a selected threshold temperature.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

The present disclosure provides a method of monitoring temperature distribution at multiple locations of a pipeline or a flow member. A flow member may include, for example, an above-ground pipeline, a subsea pipeline, a pipeline or conduit associated with a refinery, etc. Various subsea elements for which temperature may be determined may include a chemical injection skid, an umbilical, a subsea umbilical termination unit, a flying lead, a chemical metering valve, a valve for chemical insulation downhole, downhole tubing, injection mandrels, etc. In various embodiments, a sensor is used to obtain distributed temperature measurements along the flow member. The sensor (described below with respect to FIG. 2) provides the capability of obtaining temperature measurements over a selected length of the flow member rather than at only a single location of the flow member. Thus, the sensor may be used to monitor temperature at multiple locations along the flow member, thereby allowing an operator be alerted to extreme temperature conditions in the flow member in order to take a selected action.

Figure 1:
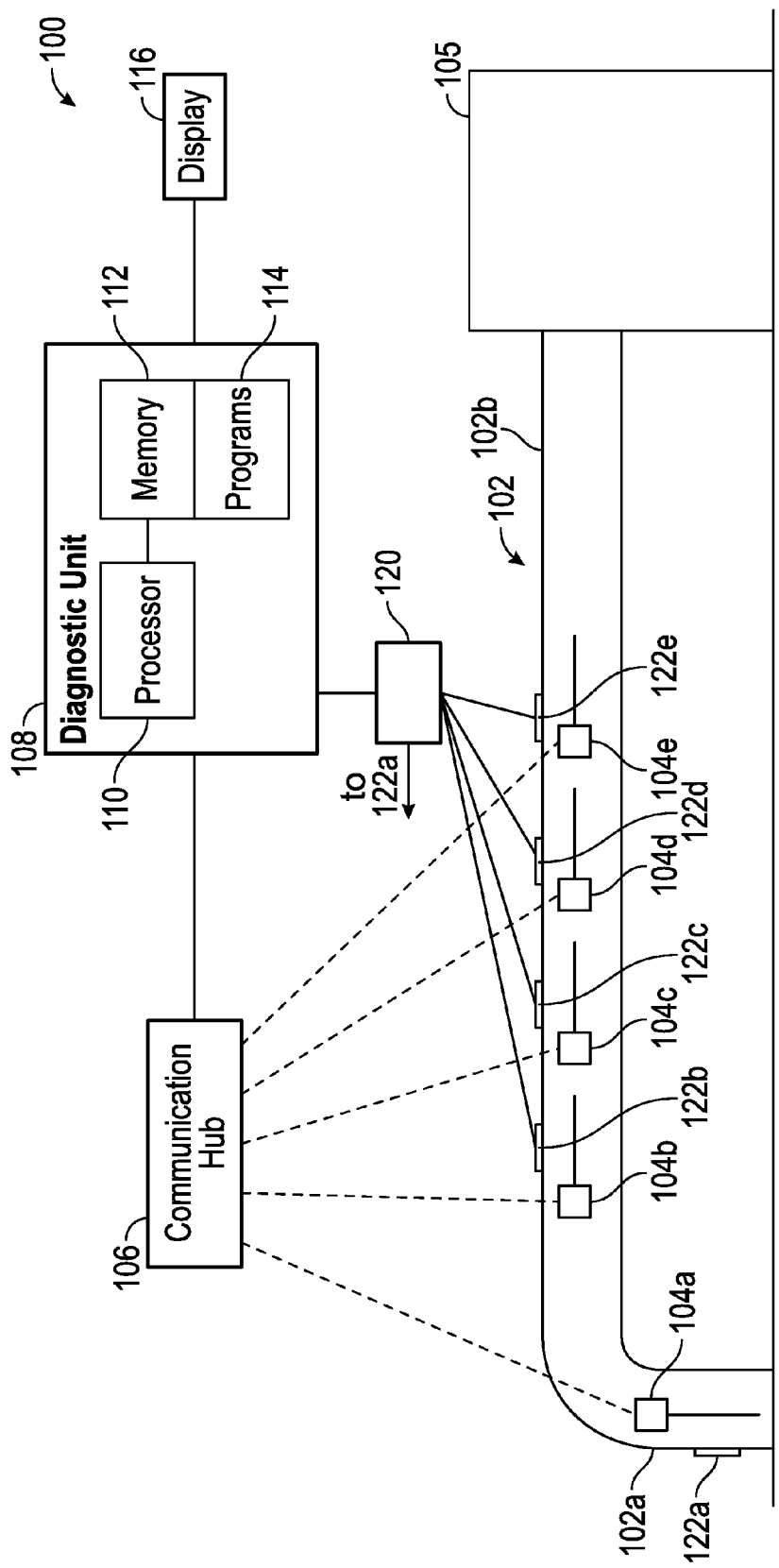
FIG. 1 shows an illustrative system for fluid transportation which includes devices for obtaining distributed temperature measurements of the fluid in an exemplary embodiment of the present disclosure.

FIG. 1 shows an illustrative system 100 for fluid transportation which includes devices for obtaining distributed temperature measurements of the fluid. The system 100 includes a flow member 102 for transport of fluid to a destination location 105, which may be a storage tank, a refinery, etc. The illustrative flow member 102 is an above-ground pipeline used for transporting the fluid at or above a surface of the earth. In alternate embodiments, the flow member 102 may be a seabed pipeline or a riser, for example. The flow member 102 may include a vertical section 102a and/or a horizontal section 102b. A plurality of sensors 104a-e is disposed on the flow member 102. Although only five sensors 104a-e are shown in FIG. 1, any number of sensors may be employed in various embodiments of the present disclosure. The plurality of sensors 104a-e may be disposed either on an outer surface of the flow member 102, an interior of the flow member 102 or a combination of an outer surface and an interior of the flow member 102. Regardless of the configuration, the sensors 104a-e are placed in thermal contact with the fluid in the flow member so that the temperatures at the sensors 104a-e are indicative of temperatures in the fluid. The sensors 104a-e generally extend over a selected length of the flow member 102 (e.g., a 30-foot section, a 10-meter section) and are capable of obtaining temperature measurements at various location distributed over the selected length. Operation of the sensors 104a-e is discussed below with respect to FIG. 2. Each of the sensors 104a-e may be in communication with a diagnostic unit 108 and may communicate distributed temperature measurements to the diagnostic unit 108. In one embodiment, the sensors 104a-e may standalone probes which wirelessly communicate data such as the temperature measurements to a wireless communication hub 106. Such standalone probes may include individual power supplies. The wireless communication hub 106 is in communication with the diagnostic unit 108. In another embodiment, the sensors 104a-e may have a direct wired connection with the diagnostic unit 108 and may transmit temperature measurements directly to the diagnostic unit 108. Such directly connected probes may have individual power supplies or may receive power from a central source, such as from the diagnostic unit 108.

The diagnostic unit 108 may receive data or electronic signals indicative of temperature from the sensors 104a-e and process the data/electronic signals to determine temperatures at various locations along the flow member 102. The diagnostic unit 108 may form a graph of temperature distribution along the flow member 102 and show the graph at a display 116 for review by a user. Also, the diagnostic unit 108 may perform an action to alter a flow parameter of the fluid, such as flow rate, flow profile, fluid composition, etc., when the measured temperature meets a selected criterion with respect to a selected threshold temperature. For example, the diagnostic unit 108 may compare the temperature measurements to a selected threshold (e.g., an upper limit on temperature) and generate an alert when one or more of the temperature measurements exceed the selected threshold. In another example, the diagnostic unit 108 may compare the temperature measurements to a lower limit on temperature and generate an alert when one or more of the distributed temperature measurements fall below the lower limit. In yet another example, the diagnostic unit 108 may monitor the temperature measurements and generate an alarm when the temperature measurements fall outside of a range of values defined by an upper limit and a lower limit. The generated alert may be visual alert, audio alert or a combination thereof.

The diagnostic unit 108 may include a processor 110 that processes the data from the sensors 104a-e according to various programs provided at the diagnostic unit 108. The diagnostic unit 108 may further include a memory storage device 112 that may include any suitable non-transitory storage medium, such as a solid-state memory, etc. The memory storage device 112 may have stored therein programs 114 that enable the processor 110 to perform the various methods described herein. The memory storage device 112 may further store raw data such as the data from the sensors 104a-e as well as processed temperature measurements.

Figure 2:
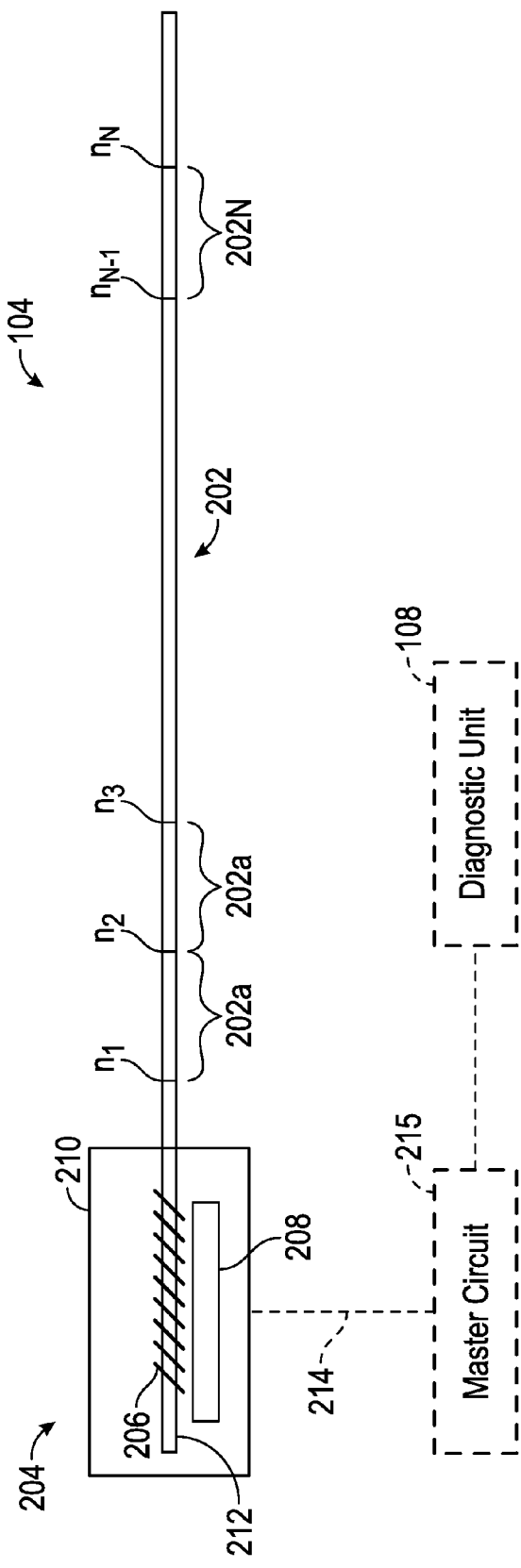
FIG. 2 shows an exemplary temperature sensor suitable for use in the system of FIG. 1 to obtain data indicative of distributed temperature in one embodiment of the present disclosure.

FIG. 2 shows an exemplary temperature sensor 104 suitable for use in obtaining data indicative of distributed temperature in one embodiment of the present disclosure. The temperature sensor 104 includes a magnetostrictive probe 202 and a magnetostrictive transducer (MST) 204 coupled to the probe 202. The probe 202 is generally a metallic member having a longitudinal axis. The probe 202 may be in the form of a rod. In an exemplary embodiment, a diameter of the probe 202 may be less than about 1 millimeter (mm) and the length of the probe 202 may be about 30 feet (about 10 meters). The probe 202 may be made of a material, such as Inconel, which is rust-resistant and suitable for use in a variety of environments. The probe 202 may be oriented so as to extend along a section of the flow member 102. The temperature sensor 104 may be suitable for obtaining temperature measurements at a plurality of locations along the probe 202 by transmitting an ultrasonic pulse longitudinally along the probe 202, as discussed below.

Reflective elements such as notches ($n_1, n_2, \ldots, n_N$) are formed at longitudinally spaced-apart locations along the probe 202. In one embodiment, the notches may be separated by a few inches. In general, the notches ($n_1, n_2, \ldots n_N$) are circumferential notches that are equally spaced along the longitudinal axis of the probe 202 when the temperature of the probe 202 is constant along the probe 202. Alternately, the notches ($n_1, n_2, \ldots n_N$) may be formed on one side of the probe 202. The notches ($n_1, n_2, \ldots n_N$) divide the probe 202 into segments or intervals (202a, 202b, . . . , 202N), wherein the intervals may have equal lengths.

The MST 204 is generally coupled to the probe 202 at one end referred to herein as end portion 212. The MST 204 includes a coil 206 and a magnet 208, which may be a permanent magnet, contained within a housing 210. In alternate embodiments, the MST 204 may include only a coil 206 without a magnet 208. The magnet 208 may be used along with signals in the coil 206 to excite and detect ultrasonic pulses in the probe 202. The magnet 208 and coil 206 serve to exit an ultrasonic pulse for transmission of the ultrasonic pulse along the probe 202. The magnet 208 and coil 206 also serve to convert received ultrasonic pulses from the probe 202 (generally reflected ultrasonic pulses) into electrical signals. These electrical signals, specifically, the time between reception of these electrical signals, are indicative of temperature at various locations along the probe 202. An end portion 212 of the probe 202 extends into the housing 210 and is wrapped by the coil 206. The coil 206 may be communicatively coupled to a master circuit 215 via a connector 214. The connector 214 may be of a size suitable for a selected tool or operation. The master circuit 215 may provide power and/or electrical signals to the coil 206 to generate an ultrasonic pulse. The master circuit 215 sends an electrical signal to the coil 206 to generate a changing magnetic field, causing magnetostriction at the end portion 212 of the probe 202 within the housing 210. The magnetostriction generates an outgoing ultrasonic pulse that propagates from the end portion 212 along the length of the probe 202 in a direction away from the coil 206. As the outgoing ultrasonic pulse propagates along the probe 202, each notch ($n_1, n_2, \ldots n_N$) reflects a portion or percentage of the outgoing ultrasonic pulse back towards the MST 204. The remaining portion or percentage of the outgoing ultrasonic pulse continues its propagation along the probe 202 away from the coil 206. A reflected ultrasonic pulse that is received at the MST 204 produces an electrical signal in the coil 206 which is sent to the master circuit 215. Because the probe 202 includes a plurality of notches, the master circuit 215 records a plurality of reflected signals, each corresponding to a selected notch in the probe 202. The master circuit 215 transmits the electronic signals as data to the diagnostic unit 108.

The relation between electronic signals generated by reflected ultrasonic pulses and temperature measurement is discussed below. As the temperature of the probe 202 increases or decreases, the modulus of elasticity of the probe changes and therefore the velocity of sound for the signal propagating through the probe 202 decreases or increases with temperature. Thus, determining the travel time between generating a pulse and receiving a reflection of the pulse at a first location (e.g., at coil 206) may be used to determine a temperature at a second location that reflects the pulse (e.g., notch $n_1$). The decreased velocity at elevated temperatures increases the travel time for the ultrasonic pulse between the first location and the second location. Therefore, the temperature may be determined at a selected notch by determining a travel time between generating the outgoing ultrasonic pulse and receiving a reflection from the notch of the generated pulse (i.e., the travel time for the ultrasonic pulse between the first location and the second location), and comparing the determined time to a time interval for an ultrasonic pulse between the first location and the second location at a known reference temperature. Although length of the probe 202 may also increase or decrease with temperature, such changes in length are substantially negligible. In another embodiment, since the length of the probe 202 changes linearly with temperature within the range of operation temperature of the tool, this length change may be pre-determined and its effect on the travel time of the ultrasonic pulse may be considered in temperature calculations. In one embodiment, a time difference between reception of reflected pulses from two notches (e.g., notches $n_1$ and $n_2$) is indicative of a temperature of a segment (e.g., segment 202a) of the probe 202 between the two notches and may therefore be used to determine a temperature of the fluid corresponding to the segment.

Referring back to FIG. 1, the diagnostic unit 108 therefore receives electrical signals related to plurality of reflective elements (i.e., notches $n_1, n_2, \ldots, n_N$) along the probe 202. The probe 202 is placed in contact, in proximity or otherwise in thermal contact with the fluid of the flow member 102 so that the temperature of the probe 202 is the same as or close to the temperature of fluid. Thus, the diagnostic unit 108 may use the received electrical signals to determine fluid temperatures at multiple locations along the flow member 102. The plurality of temperature measurements may be used to determine a temperature profile or a temperature map along the section of the flow member 102. The diagnostic unit 108 may process the temperature measurements in order to generate an alert and/or store the temperature measurements at the memory storage device 114 for calculations at a later time.

As discussed hereinabove, when one or more of the distributed temperature measurements exceeds an upper temperature limit or falls below a lower temperature limit, the processor may generate an alert for an operator. In another embodiment, the processor may perform an action to address the alert, as discussed below.

System 100 includes a chemical injection unit 120 that can be controlled by the diagnostic unit 108. The chemically injection unit 120 provides chemical additives to various valves 122a-e. The valves 122a-e may be opened and/or closed or otherwise controlled by the diagnostic unit. The diagnostic unit 108 may therefore open a valve (e.g., valve 122a) in order to inject chemicals into the flow member 102 at the location of the valve 122a. The chemicals may reduce the hydrate formation in the fluids flowing though the flow member 102. Therefore, in one embodiment, the diagnostic unit 108 receives electrical signals from a related sensor (e.g., sensor 104a) determines from the electrical signals the temperature of the fluid at a location proximate valve 122a, determines that the temperature of the fluid proximate valve 122a is such that hydrate formation is occurring and opens the valve 122a in order to introduce chemicals from the chemical injection unit 120 into the fluid at valve 122a in order to counteract the formation of hydrates. The ability to obtain temperature measurements over a length of the flow member 102 using the methods disclosed herein enables a user or processor 110 to locate an exact location for injecting chemical additives as well as provides in-situ and real-time temperature monitoring that may be used to increase or reduce chemical injection rates, thereby reducing the possibility of excessive or insufficient chemical injection.

Therefore, in one aspect the present disclosure provides a method of measuring a temperature distribution at a member, the method including: placing a probe in thermal contact with the member, the probe having a plurality of longitudinally-spaced reflective elements; generating an ultrasonic pulse at a selected location of the probe to propagate the ultrasonic pulse along the probe; receiving at the selected location reflected pulses from the plurality of longitudinally-spaced reflective elements; and determining from the reflected pulses a distribution of temperature at the member. The method may further include altering a parameter of the member based on the determined distribution of temperature. In various embodiments, the member may be: an onshore pipeline; a subsea pipeline; a riser; a flowline; a refinery pipeline; a liquid natural gas plant pipeline; a power plant pipeline; and a pipeline at a geothermal installation. The determined temperature distribution may determine an occurrence of hydrate formation in a fluid flowing in the member. Thus, a chemical additive may be injected into the fluid in response to the determined occurrence of hydrate formation. In various embodiments, a speed of the fluid, a temperature of the fluid, a composition of the fluid, etc. may be altered. A magnetostrictive transducer at the selected location may be used to generate the ultrasonic pulse and to generate the electrical signals in response to receiving the reflected pulses. The electrical signals may be transmitted from the magnetostrictive transducer to a diagnostic unit using one of: (i) a wired connection; (ii) wireless communication. In one embodiment an alarm signal may be activated when the determined temperature meets a selected criterion.

In another aspect, a system for controlling a temperature of a member includes: a sensor in thermal contact with the member, the sensor including: a probe including a plurality of longitudinally spaced-apart reflective elements, and a magnetostrictive transducer configured to generate an ultrasonic pulse for propagating along the probe and to receive ultrasonic pulses reflected from the reflective elements of the probe; and a processor configured to: determine a distribution of temperature of the member from the received ultrasonic pulses, and alter a parameter of the member when the determined distribution of temperature meets a selected criterion with respect to a selected threshold temperature. The member may be a component of an installation that is selected from the group consisting of: (i) an onshore pipeline; (ii) a subsea pipeline; (iii) a riser; (iv) a flowline; (v) a refinery pipeline; (vi) a liquid natural gas plant pipeline; (vii) a power plant pipeline; and (viii) a pipeline at a geothermal installation. The member may be a pipeline having a hydrocarbon fluid flowing therein. The diagnostic unit may determine an occurrence of hydrate formation in the hydrocarbon fluid from the determined distribution of temperature. In one embodiment, the system includes a chemical injection unit and the diagnostic unit controls the chemical injection unit in order to inject a chemical additive into the fluid to affect the occurrence of hydrate formation in the fluid. The diagnostic unit may further alter a flow parameter of the hydrocarbon fluid by altering at least one of: (i) a speed of the hydrocarbon fluid; (ii) a temperature of the hydrocarbon fluid; and (iii) a composition of the hydrocarbon fluid. The magnetostrictive transducer may communicate with the diagnostic unit via a wired connection or wireless communication. In one embodiment, the diagnostic may activate an alarm signal when the determined distribution of temperature meets the selected criterion.

In yet another aspect, the present disclosure provides an apparatus for controlling a temperature of a fluid, including: a sensor in thermal communication with the fluid, the magnetostrictive probe including: a probe including a plurality of longitudinally spaced-apart reflective elements, and a magnetostrictive transducer configured to generate an ultrasonic pulse for propagating along the probe and to receive ultrasonic pulses reflected from the reflective elements of the probe; a chemical injection unit; and a processor configured to: determine a temperature distribution of the fluid from the received ultrasonic pulses, and operate the chemical injection unit to inject a chemical additive into the fluid when the determined temperature distribution meets a selected criterion with respect to a selected threshold temperature. The fluid may be a hydrocarbon fluid and the selected threshold temperature may be a temperature at which hydrate formation occurs in the hydrocarbon fluid. The diagnostic unit may activate an alarm signal when the determined temperature distribution meets the selected criterion.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

What is claimed is:

1. A method of measuring a temperature distribution at a member having a fluid flowing therein, comprising:
    placing a magnetostrictive probe on an outer surface of the member in thermal contact with the member, the magnetostrictive probe having a plurality of longitudinally-spaced reflective notches formed therein;
    generating an ultrasonic pulse at a selected location of the magnetostrictive probe to propagate the ultrasonic pulse along the magnetostrictive probe;
    receiving at the selected location reflected pulses from the plurality of longitudinally-spaced reflective notches; and
    determining from the reflected pulses a distribution of temperature for the fluid flowing in the member.

2. The method of claim 1, further comprising altering a parameter of the fluid flow in the member based on the determined distribution of temperature.

3. The method of claim 1, wherein the member is selected from the group consisting of: (i) an onshore pipeline; (ii) a subsea pipeline; (iii) a riser; (iv) a flowline; (v) a refinery pipeline; (vi) a liquid natural gas plant pipeline; (vii) a power plant pipeline; and (viii) a pipeline at a geothermal installation.

4. The method of claim 1, further comprising determining from the distribution of temperature an occurrence of hydrate formation in a fluid flowing in the member.

5. The method of claim 4, further comprising injecting a chemical additive into the fluid in response to the determined occurrence of hydrate formation, wherein the chemical additive reduces hydrate formation in the fluid.

6. The method of claim 4, further comprising altering a temperature of the fluid.

7. The method of claim 1, further comprising generating the ultrasonic pulse and generating electrical signals in response to receiving the reflected pulses using a magnetostrictive transducer at the selected location.

8. The method of claim 7, further comprising transmitting the electrical signals from the magnetostrictive transducer to the processor using one of: (i) a wired connection; (ii) wireless communication.

9. A system for controlling a temperature of a member, comprising:
    a sensor in thermal contact with the member, the sensor including:
    a magnetostrictive probe on an outer surface of the member, the magnetostrictive probe including a plurality of longitudinally spaced-apart reflective notches formed therein, and
    a magnetostrictive transducer configured to generate an ultrasonic pulse for propagating along the magnetostrictive probe and to receive ultrasonic pulses reflected from the reflective notches of the magnetostrictive probe; and
    a processor configured to:
        determine a distribution of temperature of fluid flowing in the member from the received ultrasonic pulses, and
        alter a parameter of the fluid in the member when the determined distribution of temperature meets a selected criterion with respect to a selected threshold temperature.

10. The system of claim 9, wherein the member is a component of an installation that is selected from the group consisting of: (i) an onshore pipeline; (ii) a subsea pipeline; (iii) a riser; (iv) a flowline; (v) a refinery pipeline; (vi) a liquid natural gas plant pipeline; (vii) a power plant pipeline; and (viii) a pipeline at a geothermal installation.

11. The system of claim 9, wherein the member is a pipeline and the fluid flowing therein is a hydrocarbon fluid.

12. The system of claim 11, wherein the processor is further configured to determine from the determined distribution of temperature an occurrence of hydrate formation in the hydrocarbon fluid.

13. The system of claim 12, further comprising a chemical injection unit for injecting a chemical additive into the hydrocarbon fluid, wherein the processor is further configured to control the chemical injection unit in order to inject the chemical additive into the hydrocarbon fluid to affect the occurrence of hydrate formation in the hydrocarbon fluid.

14. The system of claim 11, wherein the processor is further configured to alter a flow parameter of the hydrocarbon fluid by altering a temperature of the hydrocarbon fluid.

15. The system of claim 9, wherein the magnetostrictive transducer communicates with the processor via one of: (i) a wired connection; (ii) wireless communication.

16. An apparatus for controlling a temperature of a fluid in a member, comprising:
- a sensor in thermal communication with the fluid, the sensor including:
- a magnetostrictive probe on an outer surface of the member, the magnetostrictive probe including a plurality of longitudinally spaced-apart reflective notches formed therein, and
- a magnetostrictive transducer configured to generate an ultrasonic pulse for propagating along the magnetostrictive probe and to receive ultrasonic pulses reflected from the reflective notches of the magnetostrictive probe;
- a chemical injection unit; and
- a processor configured to:
  - determine a temperature distribution of the fluid in the member from the received ultrasonic pulses, and
  - operate the chemical injection unit to inject a chemical additive into the fluid when the determined temperature distribution meets a selected criterion with respect to a selected threshold temperature.

17. The apparatus of claim 16, wherein the fluid is a hydrocarbon fluid and the selected threshold temperature is a temperature at which hydrate formation occurs in the hydrocarbon fluid.

* * * * *